United States Patent [19]

Prudhomme

[11] Patent Number: 4,591,434

[45] Date of Patent: * May 27, 1986

[54] ADVANCED DUAL FILTERING APPARATUS

[76] Inventor: Malcolm H. Prudhomme, P.O. Box 510, Sunset, La. 70584

[*] Notice: The portion of the term of this patent subsequent to May 14, 2002 has been disclaimed.

[21] Appl. No.: 663,417

[22] Filed: Oct. 22, 1984

Related U.S. Application Data

[63] Continuation-in-part of Ser. No. 432,009, Sep. 30, 1982, Pat. No. 4,517,082.

[51] Int. Cl.⁴ .......................................... B01D 29/24
[52] U.S. Cl. ........................... 210/117; 210/130; 210/136; 210/167; 210/238; 210/241; 210/309; 210/316; 210/440; 210/443; 210/DIG. 8; 210/500.1; 99/408
[58] Field of Search ................... 210/117–119, 210/130, 136, 167, 168, 232, 238, 241, 309, 316, 443, 444, 767, 805, 806, 440, DIG. 8, 500.1; 99/408

[56] References Cited

U.S. PATENT DOCUMENTS

| | | | |
|---|---|---|---|
| 2,149,956 | 3/1939 | Damrow | 210/DIG. 8 |
| 2,477,404 | 7/1949 | Butt | 210/DIG. 8 |
| 2,578,129 | 12/1951 | Daughery | 210/DIG. 8 |
| 2,733,815 | 2/1956 | Kwochka | 210/DIG. 8 |
| 3,159,095 | 12/1964 | Wagner | 210/DIG. 8 |
| 3,263,818 | 8/1966 | Gedrich | 210/DIG. 8 |
| 3,308,956 | 3/1967 | Yee | 210/232 |
| 3,319,790 | 5/1967 | Lindberg | 210/232 |
| 3,400,824 | 9/1968 | Weimer | 210/DIG. 8 |
| 3,481,478 | 12/1969 | Williams | 210/443 |
| 3,735,871 | 5/1973 | Bisko | 210/167 |
| 3,759,388 | 9/1973 | Thomason | 210/DIG. 8 |
| 3,849,312 | 11/1974 | Wecker | 210/DIG. 8 |
| 4,113,623 | 9/1978 | Koether | 210/167 |
| 4,128,478 | 12/1978 | Metzger | 210/167 |
| 4,282,094 | 8/1981 | Mitchell | 210/167 |
| 4,517,082 | 5/1985 | Prudhomme | 210/167 |

Primary Examiner—Ernest G. Therkorn
Attorney, Agent, or Firm—Keaty & Keaty

[57] ABSTRACT

A dual filtering apparatus for filtering deep fat frying vat oil includes a remote filtering screen attached to a tub by a flexible conduit for conveying oil and includes a fine filtering assembly that is at least partially provided within the upper chamber of the tub to further treat the oil from the remote filtering screen.

14 Claims, 6 Drawing Figures

ADVANCED DUAL FILTERING APPARATUS

CROSS REFERENCE TO RELATED APPLICATION

This is a continuation-in-part of U.S. patent application Ser. No. 432,009 filed Sept. 30, 1982, now U.S. Pat. No. 4,517,082, and entitled "Advanced Dual Filtering Apparatus", the disclosure of which is incorporated herein by reference.

BACKGROUND OF THE INVENTION

1. Field of the Invention

This invention concerns oil filters for cooking oil. More specifically, it is directed to a dual filtering apparatus which in a first stage removes contaminant particles having diameters greater than about 20–25 microns, and in the second stage removes smaller particles down to the size of about 0.1 micron.

2. Discussion of the Background of the Invention

The background of the invention is discussed in greater detail in application Ser. No. 432,009 filed Sept. 30, 1982, U.S. Pat. No. 4,517,082, which has been incorporated by reference.

The present invention employs a dual filtering system, the first stage of which removes contaminant particles greater than 25 microns in diameter while the second stage removes particles between 0.1 and 25 microns. The first stage employs suction filtration while the second stage utilizes positive pressure which more effectively forces the oil through a denser filtering media than would be possible with suction filtration.

This invention is particularly suited for restaurants and fast food outlets which cook foods in vats filled with oil for deep fat frying after covering the food with large amount of flour. When the food coated with the flour is placed into the cooking oil, the oil removes some of the flour from the surface of the food, the flour chemically interacts with the oil under conditions of high heat, and flour decomposition occurs. This decomposition results in contaminant particles which affect food taste and reduces the usable life of the cooking oil because the particles give off gases that break down the molecular structure of the cooking oil. The ultimate result is a food product which is soggy and without a firm crust, the taste and texture of the food having been spoiled.

It is an object of the invention to remove contaminant particles from cooking oil to prolong the usable life of the cooking oil by removing contaminant particles that accelerate decomposition of the cooking oil.

It is a further object of the invention to provide a portable, compact oil filter that can conveniently be used with a number of different deep frying vats.

It is a further object of the invention to provide a filtering machine requiring a minimum of maintenance while providing consistently high efficiency.

SUMMARY OF THE INVENTION

The aforementioned objects are achieved by providing a dual filtering apparatus for filtering and purifying contaminated oil used in deep fat frying vats, wherein the apparatus is a tub divided into an upper chamber and a lower chamber by a horizontal divider. A remote filtering screen is attached to the tub by a flexible conduit through which the oil is conveyed. The remote filtering screen is of a size and configuration that allow it to be placed in the vat for providing partial filtering of the contaminated oil before it is conveyed to the lower chamber of the tub. The remote screen is a two-layer, envelope like, perforated element positioned between two layers of an envelope filter, a first layer of the element and a first layer of the envelope having coaxially alignable apertures for allowing the flexible conduit to be removably inserted in fluid communicating relationship with the interior of the two-layer perforated element. In especially preferred embodiments, the envelope filter is comprised of Nylon 6 having 25 micron openings therein for filtering particles larger than 25 microns out of the oil before the oil is conveyed to the lower chamber of the tub. The Nylon 6 material, or other nylon material, of which the envelope filter is made provides a washable and reusable material which maintains a more consistent pore diameter than paper or other kinds of non-reusable envelope filters. The Nylon 6 is also a durable material that readily withstands the very high temperatures of oil in the vat. A handle is provided on the flexible conduit adjacent the filter screen for manipulating the remote screen and placing it inside the vat of oil to be filtered.

A fine filtering assembly is disposed at least partially within the upper chamber of the tub and comprises a cylindrical cannister having a cap covering the cannister on its top, the cap having an annular depending skirt that fits into the interior of the cannister and contiguously abuts an inner wall of the cannister. A central conduit passes through a portion of the cannister and extends in fluid communicating relationship to the lower chamber of the tub. A perforated lower retainer plate is disposed around the central conduit and forms a lower sediment area between the bottom of the cannister and the lower retainer plate. A perforated upper retainer plate is disposed around the central conduit and forms an upper void area, the central conduit passing at least partially into and being in fluid communicating relationship with the upper void area. A tightly wound fibrous filter is placed in surrounding relationship to the central conduit between the upper and lower plates, upward displacement of the filter being prevented by the upper plate which is securely held against the filter by the depending skirt of the cap when the cap is in place. The depending skirt of the cap eliminates any "channeling" of oil around the fibrous filter. In preferred embodiments, the fibrous filter is comprised of 30–50 percent crepe paper, and in especially preferred embodiments 40% crepe paper. The crepe paper provides a material that is scarely wetted and withstands the high heats and pressures experienced by filter in a a hot oil filtering machine.

An inlet conduit is provided through the bottom of the cannister through which partially filtered oil from the flexible conduit is conveyed to the lower sediment area of the cannister and through the fibrous filter. An overflow conduit is also provided through the bottom of the cannister, the overflow conduit being provided with a pressure relief valve which opens in response to an increase of pressure in the lower sediment area for dispelling overflow from the cannister to the lower chamber through an overflow conduit. In preferred embodiments, the pressure relief valve opens in response to pressures of approximately 80 psi.

An introduction port is found in the inlet conduit through which oil from the flexible conduit is introduced into the inlet conduit. A first check valve is located in the inlet conduit between the introduction port and a portion of the inlet conduit which empties into the lower chamber of the tub. This first check valve moves between a closed position in which it prevents passage of oil to the lower chamber when oil is being drawn through the flexible conduit and forced through the fibrous filter, and an open position in which oil is allowed to move through the inlet conduit from the lower chamber to the flexible conduit for expelling cleaned oil through the flexible conduit back into the vat. A second check valve is positioned in the central conduit which moves between a closed position when oil is being expelled through the flexible conduit and an open position when oil is being forced through the fibrous filter into the central conduit.

DETAILED DESCRIPTION OF THE PREFERRED EMBODIMENT

Figure 1:
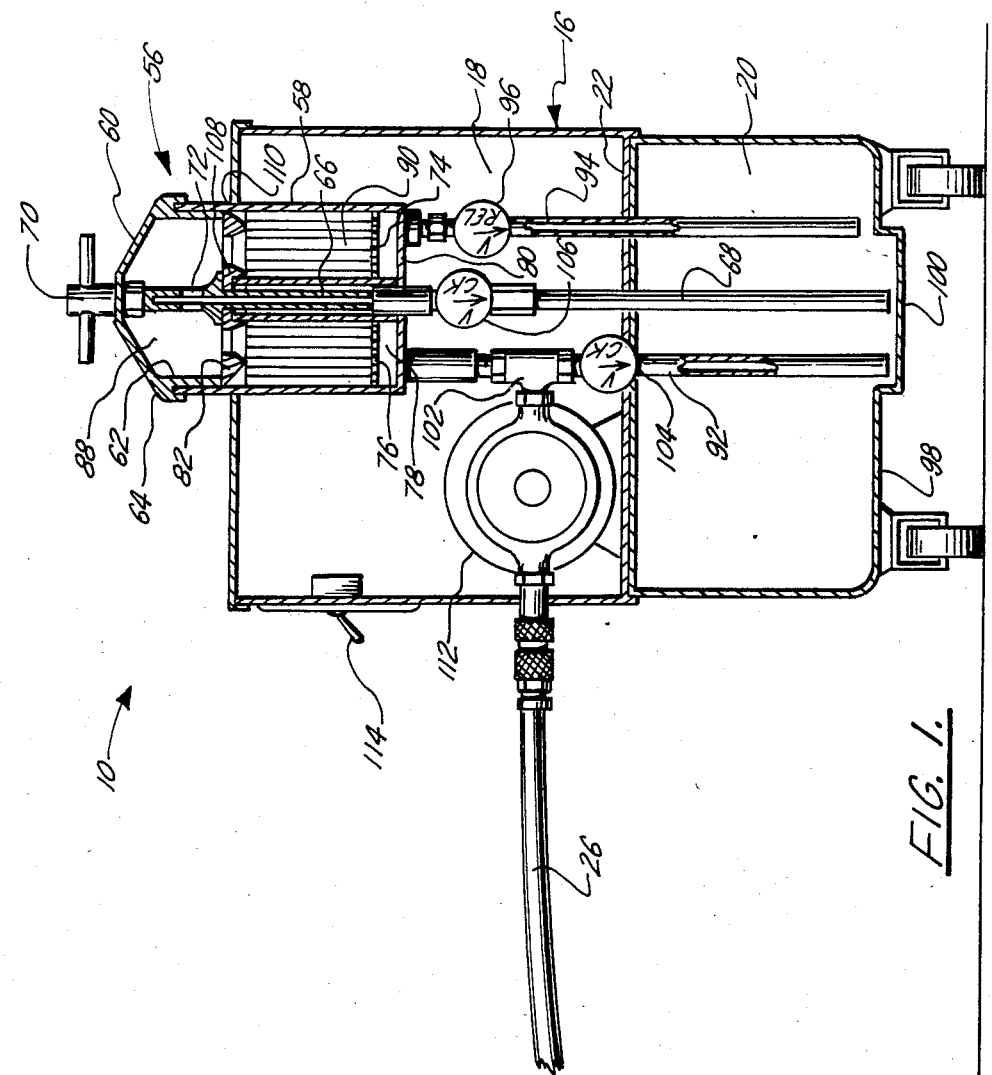
FIG. 1 is a fragmentary, side elevational view of the filtering apparatus of the present invention, portions of the filter being broken away to display the internal parts of the apparatus, the flexible conduit being shown in fragments.
Figure 1:
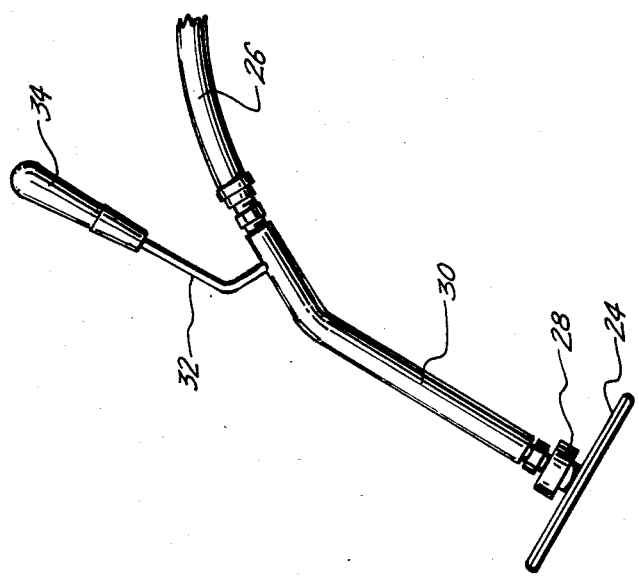

Turning now to the drawings, a dual filtering apparatus 10 is shown for filtering and purifying contaminated oil 12 which is used in a deep fat frying vat 14. Apparatus 10 comprises a tub 16 divided into an upper chamber 18 and a lower chamber 20 by a substantially horizontal divider 22. In especially preferred embodiments, upper chamber 18 is a box like member separate and apart from lower chamber 20, which can also be a box like member with an open upper face. The box forming upper chamber 18 is releasably connected to the box forming lower chamber 20 so that the upper box can be removed from the lower box to provide ready access to lower chamber 20.

Figure 2:
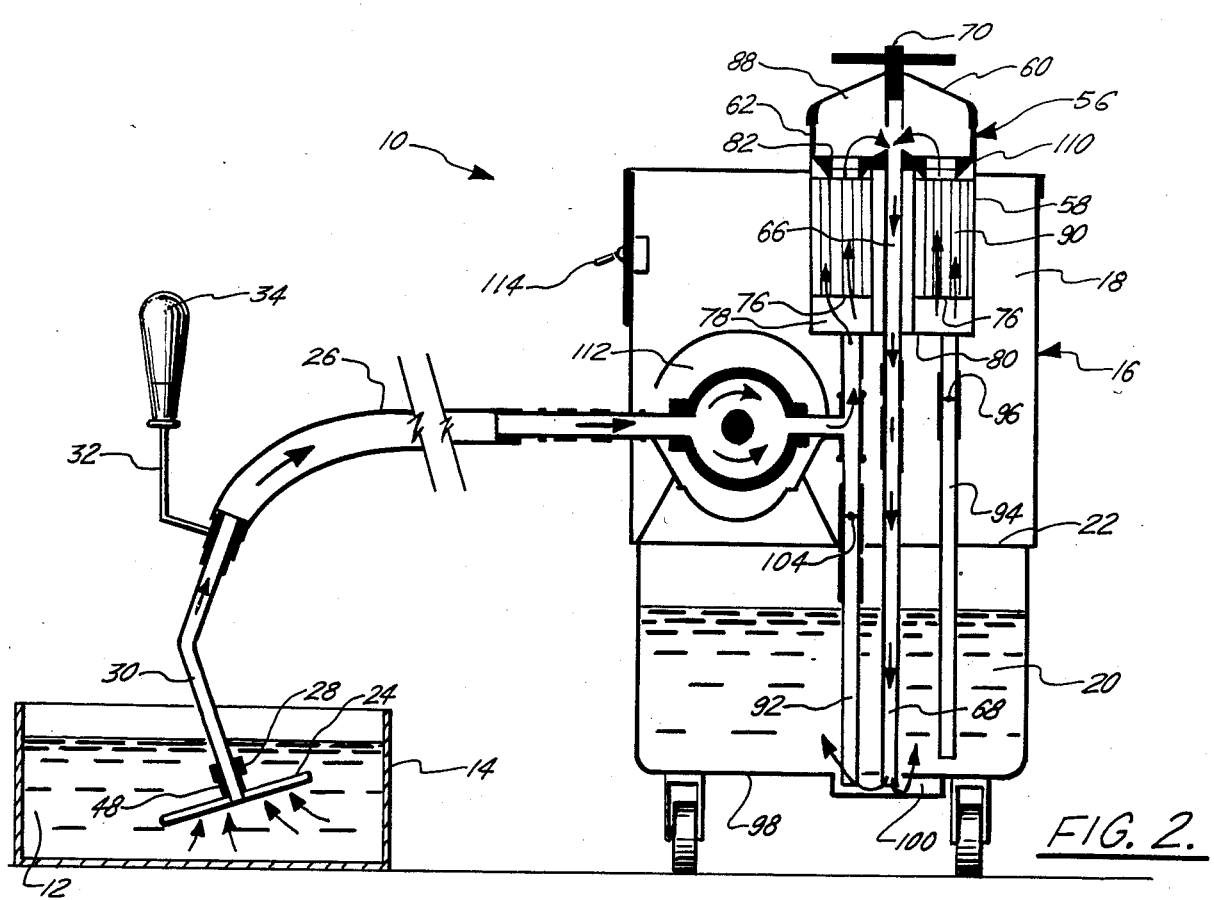
FIG. 2 is a schematic view of the filtering apparatus shown in FIG. 1, the remote filter screen having been placed in an oil vat to be filtered and oil being drawn through the flexible conduit and forced through the tightly wound fibrous filter.

A remote filtering screen 24 is attached to tub 16 by a flexible conduit 26 through which oil 12 is conveyed, screen 24 being adapted for placement in vat 14, as shown in FIG. 2 for providing partial filtering of oil 12 before it is conveyed to tub 16 through flexible conduit 26. In preferred embodiments, screen 24 is releasably connected to conduit 26 by means of a quick connect-/disconnect coupling 28 of the type known in the art. Coupling 28 permits screen 24 to be quickly connected or disconnected from flexible conduit 26, for reasons which will be explained below. Conduit 26 is preferably made of a flexible material such as rubber, and is provided with a steel or otherwise heat resistant forward shank 30 having a handle 32 with an enlarged knob 34 attached thereto.

Figure 4:
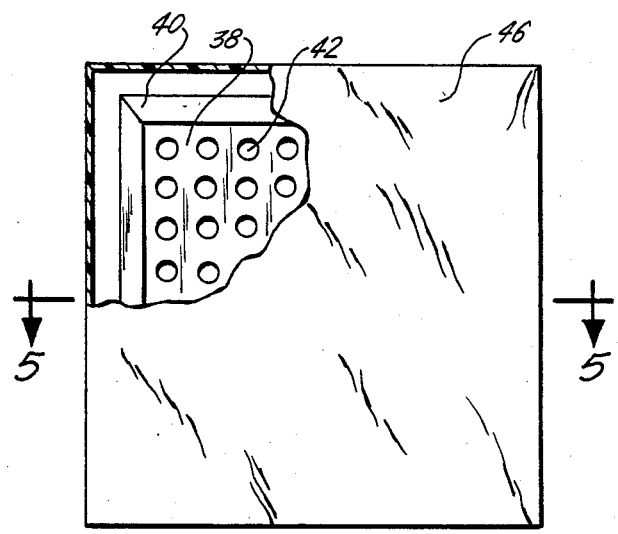
FIG. 4 is a top plan view of the remote filter screen of the apparatus shown in FIG. 1, parts of the envelope filter being broken away for clarity to show an envelope-like metal filter therewithin.
Figure 5:
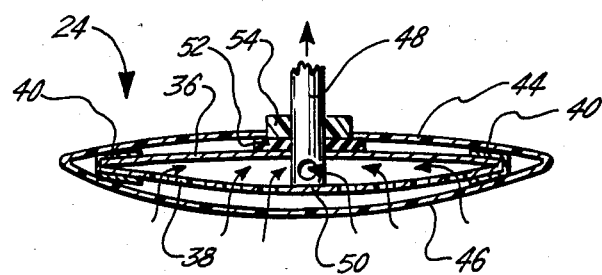
FIG. 5 is a cross-sectional view taken along section lines 5—5 in FIG. 4.

As best seen in FIGS. 4 and 5, screen 24 is comprised of a two layer, envelope like, perforated element having first layer 36 and second layer 38 held together along its edges by square bracket 40. Both layers 36, 38 of the element are provided with rows of circular perforations 42, which are best seen in FIG. 4.

The element comprised of layers 36, 38 is positioned between first layer 44 and second layer 46 of an envelope filter. First layer 36 of the element and first layer 44 of the envelope filter have coaxially alignable apertures for allowing the flexible conduit to be inserted in fluid communicating relationship with the interior of the two-layer perforated element formed by layers 36, 38. This fluid communication is achieved by a tubular projection 48 from coupling 28 which penetrates through the coaxially aligned apertures, projection 48 being provided with an intake hole 50 between layers 36, 38. A washer 52 is provided between first layer 44 of the envelope filter and first layer 36 of the element, and a sealing member 54 is positioned above washer 34 for providing a more effective fluid seal.

In especially preferred embodiments, layers 44, 46 of the envelope filter (the envelope filter hereinafter being referred to as envelope filter 44, 46) are comprised of the material known as Nylon 6 which is a polymer of caprolactam (q.v.), originated by I.G. Farbenindustrie in 1940. A portion of the nylon six molecule, based upon caprolactam, may appear as

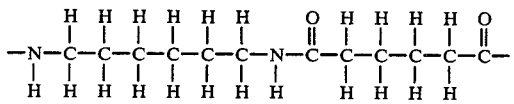

Nylon 6 is available from E. I. DuPont de Nemours & Company Wilmington, Del. Filter 44, 46 is spun so that it is provided with 25 micron openings which will filter out particles having diameters greater than about 25 microns. The Nylon 6 envelope filter 44, 46 is an advance over other machines using a paper filter because the pores in a paper filter tend to change diameter when wet, thereby altering dimensions of the pore and usually permitting larger particles to be conveyed into conduit 26. The Nylon 6 material is also ideally resistant to high temperatures in the deep fat frying vat. Although the preferred embodiment employs Nylon 6 in the remote filter, other materials containing Nylon fiber or even paper fiber can be used.

A fine filtering assembly comprised of a cannister filter 56, is partially disposed within upper chamber 18 of tub 16, the cannister filter 56 having its topmost portions extending through the top of upper chamber 18. Cannister filter 56 comprises a generally cylindrical cannister 58 having a cap 60 covering cannister 58 on its top. Cap 60 is an annular, dome-like member having an annular depending skirt 62 that fits into the interior of cannister 58. Cap 60 is provided with a lip 64 that extends outwardly beyond skirt 62 for providing a means which engages the top of cannister 58 for holding cap 60 in position on top of cannister 58. Skirt 62 depends from cap 60 so that skirt 62 is in annular abutting relationship to the interior wall of cannister 58.

A central conduit 66 extends at least through a portion of cannister 58 and extends downwardly through tube 68 which forms an extension of conduit 66. Conduit 66 terminates adjacent cap 60 and is provided with external threads adjacent its upper termination. An internally threaded tee 70 is rotatably positioned through cap 60, the internal threads of tee 70 mating with the external threads of the upper termination of conduit 66 to selectively secure cap 60 to cannister 58. Central conduit 66 is provided with one or more openings 72 for providing fluid communicating relationship between conduit 66 and an upper void area to be described below. Conduit 66 is solid except for opening 72, and tube 68 traverses almost the entire width of lower chamber 20. A hole is provided in divider 22 which permits tube 68 to span both chambers 18, 20.

Figure 6:
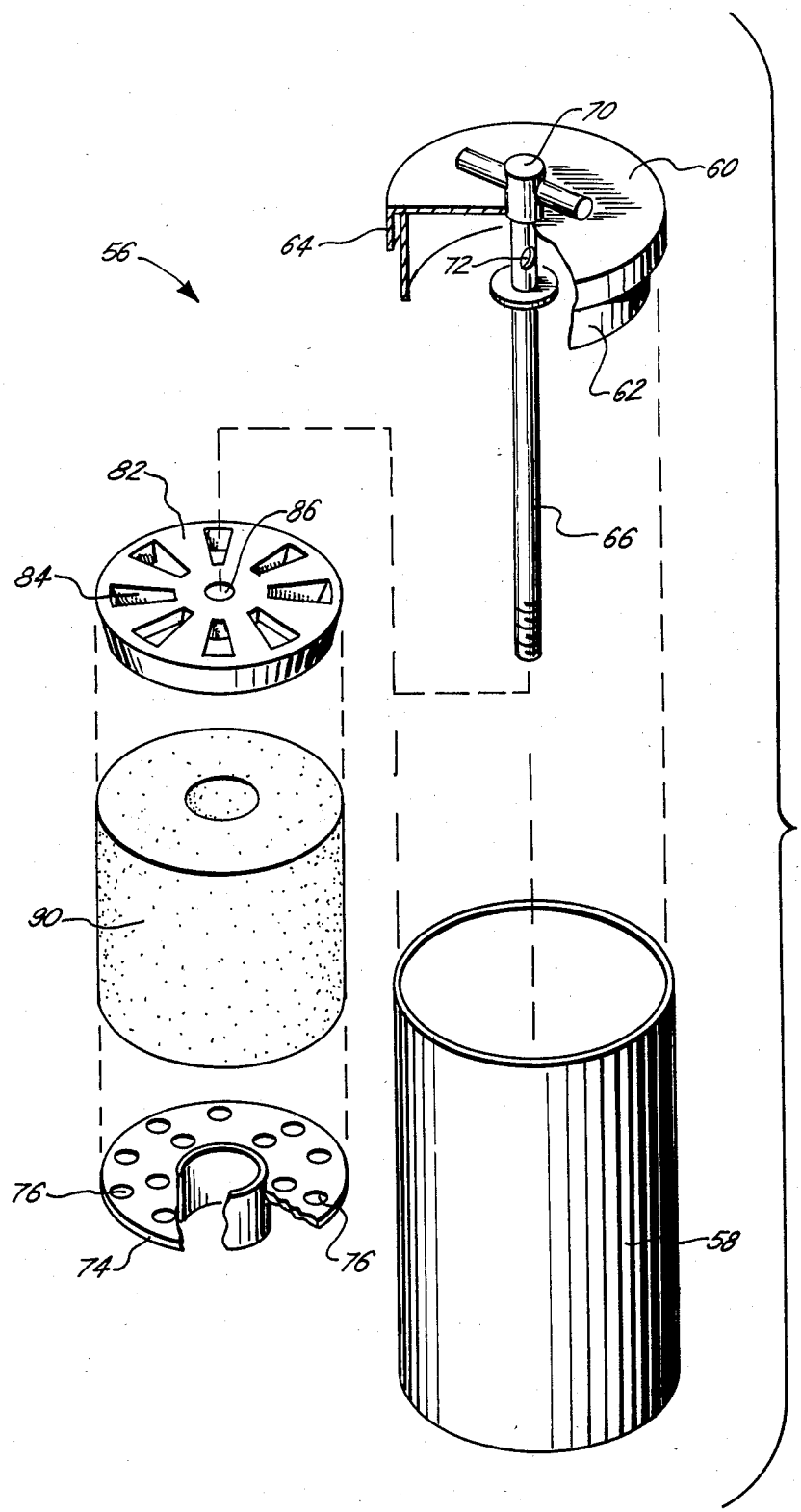
FIG. 6 is an exploded, perspective view of the cannister filter of the apparatus shown in FIG. 1.

A lower retainer plate 74 is provided with a plurality of perforations 76 (best seen in FIG. 6). Plate 74 is disposed around central conduit 66 by means of a central aperture in plate 74. Plate 74 is secured in a permanent position on the outside of central conduit 66 so that a lower sediment area 78 is formed between bottom 80 of cannister 58 and lower retainer plate 74.

An upper retainer plate 82 is provided with a plurality of perforations 84 in the form of perforated slats, plate 82 also being provided with a central opening 86 for placement in sliding engagement around central conduit 66. An upper void area 88 is formed between plate 82 and cap 60. Central conduit 66 is in fluid communicating relationship with upper void area 88 by means of opening 72 in central conduit 66.

A tightly wound fibrous filter 90 is provided in surrounding relationship to central conduit 66 between lower and upper plates 74, 82. Upward displacement of fibrous filter 90 is prevented by upper plate 82, which is held securely against fibrous filter 90 by depending skirt 62 of cap 60. Fibrous filter 90 is supported at its bottom by lower retainer plate 74 which is held in a fixed position around central conduit 66. It has been found that an especially effective fibrous filter is one which is comprised of 30–50 percent crepe paper, and an even more especially preferred paper is comprised of 40% crepe. Crepe paper resists absorption of water and provides great resistance to high temperatures and pressures which the fibrous filter experiences during the filtering operation described in greater detail below.

An inlet conduit 92 traverses the width of lower chamber 20 and part of the width of upper chamber 16 before entering cylindrical cannister 58 through the bottom thereof. Overflow conduit 94 is provided through bottom 80 of cannister 58, and is provided with a pressure relief valve 96 which opens in response to an increase of pressure in lower sediment area 78 for dispelling overflow from cannister 58 to lower chamber 20 through overflow conduit 94. Pressure relief valve 96 is spring-biased so that it opens, in preferred embodiments, in response to a buildup of pressure to approximately 80 psi in lower sediment area 78. Overflow conduit 94 traverses the width of lower chamber 20 so that it terminates adjacent bottom 98 of tub 16.

Bottom 98 of tub 16 is provided with depression 100 which forms a lower area to which oil in bottom chamber 20 can move.

An introduction port 102 is provided in inlet conduit 92 through which oil from flexible conduit 26 is introduced into inlet conduit 92.

A first check valve 104 is provided in inlet conduit 92 which moves between a closed position (FIG. 2) for preventing passage of oil to lower chamber 20, and an open position (FIG. 3) for allowing oil to move through inlet conduit 92 from lower chamber 20, thence into flexible conduit 26. In preferred embodiments check valve 104 responds to pressures of about 1–2 psi.

A second check valve 106 is disposed in central conduit 66 which moves between a closed position (FIG. 3) and an open position (FIG. 2). Second check valve 106 is spring-biased such that it opens in response to pressures of about 1–2 psi.

A first compression sealing means 108 is secured to upper plate 82 in surrounding relationship to central conduit 66.

A second compression sealing means 110 is circumferentially secured to upper plate 82 adjacent the inner wall of cannister 58 and in sealing engagement therewith.

A motor driven pump 112 is disposed in upper chamber 18 by means of bolts, or the like, which secure it to divider 22. Pump 112 is provided with rotors that draw oil into tub 16 and propel it through cannister 58 in the fashion described below.

In operation, electrical energy is supplied to the motor that operates pump 112, thereby creating a suction in flexible conduit 26 which draws oil 12 from vat 14 through envelope filter 44, 46, through first and second layers 36, 38 of the filter element, and into tubular projection 48 of coupling 28 through hole 50. The oil then moves in the direction of the arrows indicated in FIG. 2 through shank 30, into flexible conduit 26, and past pump 112 so that it is propelled through introduction port 102 by positive pressure. Oil 12 then moves into inlet conduit 92 and upwardly towards cannister filter 56 since check valve 104 remains closed. The oil is then forced upwardly through lower sediment area 78, through the perforations 76 of lower retainer plate 74, and upwardly through fibrous filter 90 and upper retainer plate 82. As the oil moves through fibrous filter 90, the tightly wound paper having a forty percent crepe content filters out particles having diameters as small as about 0.1 micron. The now cleansed oil moves through perforations 84 in upper retainer plate 82 into upper void area 88, through opening 72 and into central conduit 66 in the direction of the arrows shown in FIG. 2. Movement of oil through central conduit 66 in the downward direction shown by the arrow in FIG. 2 opens check valve 106 so that oil moves through tube 68 and is expelled into depression 100. Since tube 68 juts into depression 100, oil is expelled into lower chamber 20 without bringing the oil into significant contact with air. This arrangement is preferable since contact of the oil with atmospheric oxygen and other elements can bring about degradative oxidation of the oil.

Figure 3:
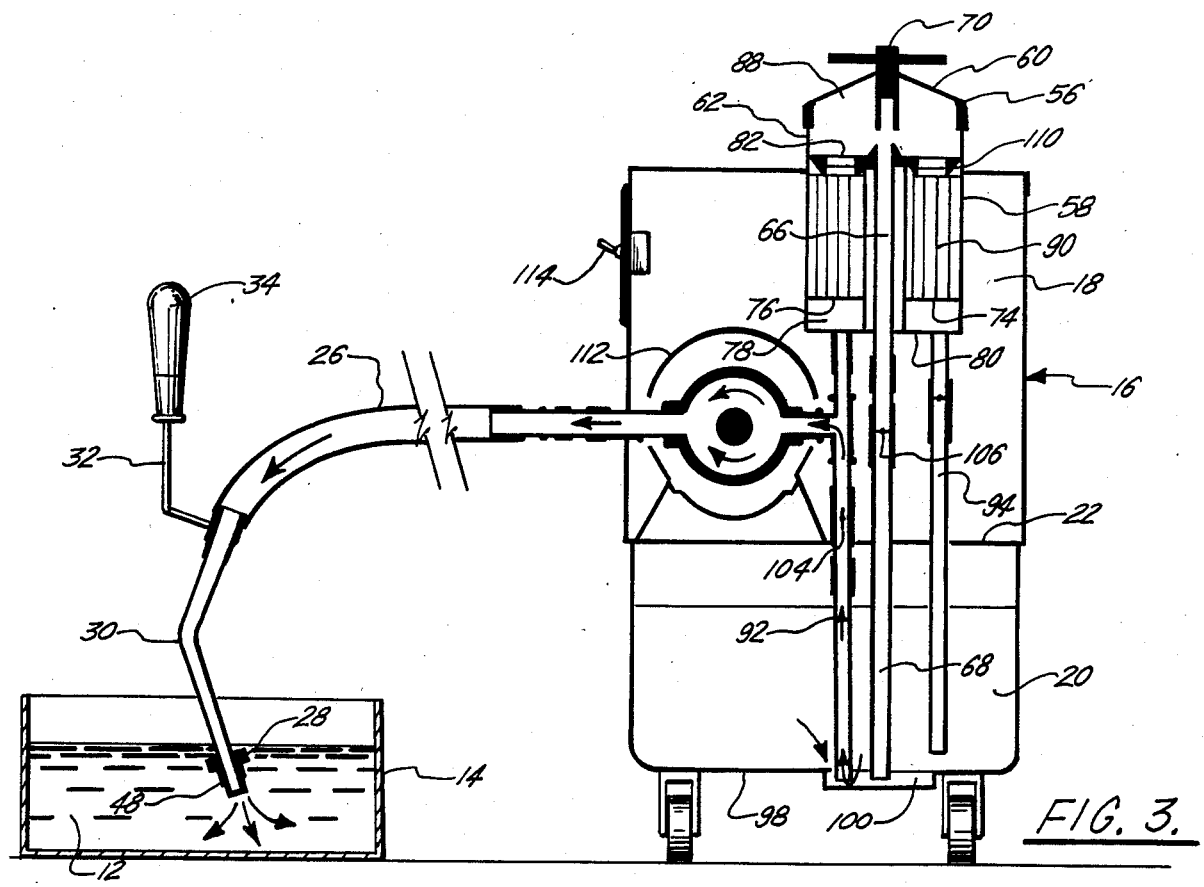
FIG. 3 is a schematic view similar to FIG. 2, but showing oil being expelled from the lower chamber of the tub and being expelled through the flexible conduit back into the vat.

The oil can then be retained in lower chamber 20 until an operator desires to return the oil to the cooking vat for additional cooking of food. A switch 114 located on the outside of tub 16 can then be moved to reverse the direction of rotation of the motor for pump 112, thereby reversing the direction of flow of fluid through pump 112. The electrical wires connecting switch 114 to pump 112 have not been shown for purpose of clarity, but are conventional. Reverse flow of the fluid out of tub 16 is best shown in FIG. 3 wherein oil is drawn out of depression 100, into inlet conduit 92 and past first check valve 104 which is now opened by the flow of oil upwardly through inlet conduit 92. Oil is then pulled into pump 112 by negative pressure and propelled positively past the pump into flexible conduit 26, shank 30 and back into vat 14. As can be seen in FIG. 3, remote filtering screen 24 is removed from coupling 28 so that oil can be freely placed back in vat 14 without the impediment of having to pass through screen 24.

During the filtering operation, shank 30 can easily be manipulated by handle 32 if an operator grasps knob 34 thereof.

Changes and modifications in the specifically described embodiments can be carried out without departing from the scope of the invention which is intended to be limited only by the scope of the appended claims.

I claim:

1. A dual filtering apparatus for filtering and purifying contaminated oil used in a deep-fat frying vat, comprising:

a tub;

a remote filtering screen attached to the tub by a external conduit through which the oil is conveyed from the frying vat, the remote filtering screen being adapted for placement in the vat and providing partial filtering of the oil before it is conveyed to the tub;

a fine filtering assembly carried by the tub and comprising a generally cylindrical canister having a cap covering the canister on its top, the cap having an annular depending skirt that fits into the interior of the canister;

a central conduit through a portion of the canister and in fluid communicating relationship with the tub;

a perforated, lower retainer plate disposed around the central conduit and forming together with a bottom and side walls of the cannister a lower sediment area;

a perforated upper retainer plate disposed around the central conduit forming together with the cap an upper void area, the central conduit being in fluid communicating relationship with the upper void area;

a fine filter means mounted in surrounding relationship to the central conduit between the lower and upper plates, upward displacement of the filter means being prevented by the upper plate which is held against the fine filter means by the depending skirt of the cap;

an inlet conduit through the bottom of the canister through which partially filtered oil is conveyed from the external conduit to the lower sediment area and through the fine filter means;

an overflow conduit through the bottom of the canister, the conduit being provided with a pressure relief valve which opens in response to an increase of pressure in the lower sediment area;

a means for drawing oil through the external conduit and forcing it into the inlet conduit, through the fine filter means, into the central conduit and thence to the tub;

means for drawing oil from the tub and expelling it through the external conduit into the vat.

2. The apparatus of claim 1 wherein the remote filtering screen is comprised of a two-layer, envelope-like perforated element positioned between two layers of an envelope filter, a first layer of the element and a first layer of the envelope filter having coaxially alignable apertures for allowing the external conduit to be inserted in fluid communicating relationship with the interior of the two-layered perforated element.

3. The apparatus of claim 2 wherein the envelope filter is comprised of Nylon 6.

4. The apparatus of claim 3 wherein the envelope is provided with 25 micron openings.

5. The apparatus of claim 4 wherein the fine filter means is comprised of 30-50% crepe.

6. The apparatus of claim 5 wherein a first compression sealing means is fixed to the upper plate in surrounding relationship to the central conduit and a second compression sealing means is circumferentially fixed to the upper plate adjacent the inner wall of the canister in sealing engagement therewith.

7. The apparatus of claim 6 wherein the means for drawing the oil through the external conduit and forcing it into the inlet conduit, through the fine filter means, and into the central conduit, and the means for drawing the oil from the tub and expelling it through the external conduit, are the pump, the pump being disposed in the tub.

8. The apparatus of claim 7 wherein a first check valve is provided in the inlet conduit, the check valve being closed for preventing passage of oil to the tub when oil is being drawn through the external conduit and forced through the fine filter means, the check valve being open for allowing oil to move through the inlet conduit from the tub to the external conduit when oil is being expelled through the external conduit.

9. The apparatus of claim 8 wherein the central conduit is provided with a second check valve which moves between a closed position when oil is being expelled through the external conduit and an open position when oil is being forced through the fine filter means and into the central conduit.

10. The apparatus of claim 9 wherein the flexible conduit is provided with a handle for manipulating the remote screen and placing it inside the vat of oil to be filtered.

11. A dual filtering apparatus for filtering and purifying contaminated oil used in deep-fat frying vats, comprising:

a tub divided into an upper chamber and a lower chamber by a substantially horizontal divider;

a remote filtering screen attached to the tub by a flexible conduit through which the oil is conveyed, the remote filtering screen being adapted for placement in the vat and providing partial filtering of oil before it is conveyed to the tub, the remote screen being comprised of a two-layer, envelope-like, perforated element positioned between two layers of an envelope filter, a first layer of the element and a first layer of the envelope filter having coaxially alignable apertures for allowing the flexible conduit to be inserted in fluid communicating relationship with the interior of the two-layer perforated element, the envelope filter being comprised of Nylon 6 having 25 micron openings therein;

a handle on the flexible conduit for manipulating the remote screen and placing it inside the vat of oil to be filtered;

a fine filtering assembly at least partially disposed within the upper chamber of the tub and comprising a generally cylindrical canister having a cap covering the canister on its top, the cap having an annular depending skirt that fits into the interior of the canister;

a central conduit through a portion of the canister and in fluid communicating relationship with the lower chamber of the tub;

a perforated lower retainer plate disposed around the central conduit and forming together with the bottom of the cannister a lower sediment area;

a perforated upper retainer plate disposed around the central conduit and forming together with the cap an upper void area, the central conduit being in fluid communicating relationship with the upper void area;

a tightly wound fibrous filter in surrounding relationship to the central conduit between the lower and upper plates, upward displacement of the filter being prevented by the upper plate which is held against the filter by the depending skirt of the cap, the fibrous filter being comprised of 30–50% crepe;

an inlet conduit through the bottom of the canister through which partially filtered oil is conveyed from the flexible conduit to the lower sediment area and through the fibrous filter;

an overflow conduit through the bottom of the canister, the overflow conduit being provided with a pressure relief valve which opens in response to an increase in pressure in the lower sediment area for dispelling overflow from the canister to the lower chamber through an overflow conduit;

an introduction port in the inlet conduit through which oil from the flexible conduit is introduced into the inlet conduit;

a first check valve in the inlet conduit which moves between a closed position for preventing passage of oil to the lower chamber when oil is being drawn through the flexible conduit and forced through the fibrous filter, and an open position for allowing oil to move through the inlet conduit from the lower chamber to the flexible conduit when oil is being expelled through the flexible conduit;

a second check valve in the central conduit which moves between a closed position when oil is being expelled through the flexible conduit and an open position when oil is being forced through the fibrous filter and into the central conduit;

a first compression sealing means secured to the upper plate in surrounding relationship to the central conduit and a second compression sealing means circumferentially secured to the upper plate adjacent the inner wall of the canister in sealing engagement therewith;

a motor-driven pump disposed in the upper chamber for drawing fluid from the vat through the flexible conduit and forcing it into the inlet conduit when the check valve in the inlet conduit is in the closed position and the motor is rotating in a forward direction, and for drawing oil through the inlet conduit into the flexible conduit and back to the vat when the check valve in the inlet conduit is in the open position and the direction of the motor is reversed.

12. A dual filtering apparatus for filtering and purifying contaminated oil used in a deep-fat frying vat, comprising:

a tub;

an external conduit in fluid communicating relationship with the tub and through which oil is conveyed from the frying vat;

a remote filtering screen between the vat and external conduit for providing partial filtering of the oil before it is conveyed to the tub;

a fine filtering assembly carried by the tub and comprising a generally cylindrical canister having a cap covering the canister on its top, the cap having an annular depending skirt that fits into the interior of the canister;

a central conduit through a portion of the canister and in fluid communicating relationship with the tub;

a perforated, lower retainer plate disposed around the central conduit and forming together with a bottom and side walls of the canister a lower sediment area;

a perforated upper retainer plate disposed around the central conduit forming together with the cap an upper void area, the central conduit being in fluid communicating relationship with the upper void area;

a fine filter means mounted in surrounding relationship to the central conduit between the lower and upper plates, upward displacement of the filter means being prevented by the upper plate which is held against the fine filter means by the depending skirt of the cap;

an inlet conduit through the bottom of the canister through which partially filtered oil is conveyed from the external conduit to the lower sediment area and through the fine filter means;

an overflow conduit through the bottom of the canister, the conduit being provided with a pressure relief valve which opens in response to an increase of pressure in the lower sediment area;

means for drawing oil through the external conduit and forcing it into the inlet conduit, through the fine filter means, into the central conduit and then to the tub; and means for drawing oil from the tub and expelling it through the external conduit into the vat.

13. The dual filtering apparatus of claim 12 wherein the remote filtering screen is placed adjacent the bottom of the vat being filtered.

14. The dual filtering apparatus of claim 13 wherein a trough-like depression is contained in the bottom of the vat being filtered, the remote filtering screen being contained within the trough, the external conduit being in fluid communicating relationship with the interior of the trough.

* * * * *